United States Patent
McCullough et al.

(10) Patent No.: US 10,625,730 B2
(45) Date of Patent: Apr. 21, 2020

(54) SYSTEM AND METHOD FOR STARTING A HYBRID POWERTRAIN FOR A VEHICLE

(71) Applicant: Ford Global Technologies, LLC, Dearborn, MI (US)

(72) Inventors: Todd McCullough, Bloomfield Hills, MI (US); Scott James Thompson, Canton, MI (US); Stuart N. Ford, Farmington Hills, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 15/646,248

(22) Filed: Jul. 11, 2017

(65) Prior Publication Data

US 2019/0016330 A1 Jan. 17, 2019

(51) Int. Cl.
| | |
|---|---|
| *B60W 20/40* | (2016.01) |
| *B60W 20/10* | (2016.01) |
| *B60W 10/06* | (2006.01) |
| *B60W 10/08* | (2006.01) |
| *B60W 10/02* | (2006.01) |
| *B60W 10/30* | (2006.01) |

(52) U.S. Cl.
CPC ............ *B60W 20/40* (2013.01); *B60W 10/02* (2013.01); *B60W 10/06* (2013.01); *B60W 10/08* (2013.01); *B60W 10/30* (2013.01); *B60W 20/10* (2013.01); *B60W 2710/027* (2013.01)

(58) Field of Classification Search
CPC ...... B60W 10/02; B60W 10/06; B60W 10/08; B60W 20/10; B60W 20/40
See application file for complete search history.

(56) References Cited

U.S. PATENT DOCUMENTS

| | | | |
|---|---|---|---|
| 8,123,656 | B2 | 2/2012 | Schoenek et al. |
| 9,068,546 | B2 | 6/2015 | Gibson et al. |
| 2016/0297292 | A1 | 10/2016 | Sato et al. |

*Primary Examiner* — Jacob S. Scott
(74) *Attorney, Agent, or Firm* — David B. Kelley; Brooks Kushman P.C.

(57) ABSTRACT

A vehicle includes a disconnect clutch selectively coupling an engine and an electric machine. The vehicle further includes a mechanical pump driven by the electric machine and operable to pressurize fluid for the clutch. The vehicle includes a controller programmed to, in response to the electric machine being inoperable, activate an auxiliary starter to start the engine, activate an electric pump operable to pressurize fluid to the clutch, and operate the engine to drive the mechanical pump.

20 Claims, 3 Drawing Sheets

SYSTEM AND METHOD FOR STARTING A HYBRID POWERTRAIN FOR A VEHICLE

TECHNICAL FIELD

This application generally relates to operating a hybrid vehicle during conditions in which a high-voltage electric machine is unusable.

BACKGROUND

A hybrid vehicle includes an electric machine powered by high-voltage power. The electric machine is capable of providing propulsion torque for the vehicle. The electric machine is further used for cranking an engine for starting. During conditions in which the high-voltage electric machine is unusable, the engine cannot be started.

SUMMARY

A hybrid powertrain control system includes a controller programmed to, responsive to an electric machine, configured to drive a mechanical pump operable to pressurize fluid for a clutch between an engine and the electric machine, being inoperable, (i) activate an auxiliary starter to start the engine, (ii) activate an electric pump configured to pressurize the fluid, (iii) actuate a valve to flow fluid to the clutch, and (iv) operate the engine to drive the mechanical pump.

The mechanical pump may be operable to pressurize fluid for the clutch to a fluid pressure that is greater than a predetermined locking pressure that causes the clutch, when the valve is actuated, to lock. The electric pump may be operable to pressurize the fluid for the clutch to a fluid pressure level that is less than or equal to a predetermined electric pump maximum pressure that is less than the predetermined locking pressure. The controller may be further programmed to command transmission shift clutches that are coupled to a same fluid circuit as the clutch to an off state to maximize pressure to the clutch. The controller may be further programmed to operate the engine at a speed that is at least a predetermined engine speed that is configured to cause the mechanical pump to rotate at a predetermined pump speed at which a fluid pressure exceeds a predetermined locking pressure of the clutch. The controller may be further programmed to, in response to activating the electric pump, increase torque of the engine to prevent a speed of the engine from decreasing. The controller may be further programmed to, in response to the electric machine being inoperable, disable auto-stopping of the engine.

A vehicle includes a clutch selectively coupling an engine and an electric machine and a mechanical pump driven by the electric machine and operable to pressurize fluid for the clutch. The vehicle further includes a controller programmed to, responsive to the electric machine being inoperable, activate an electric pump operable to pressurize fluid to the clutch and activate an auxiliary starter to start the engine to drive the mechanical pump.

The controller may be further programmed to, in response to the electric machine being inoperable, disable auto-stopping of the engine. The controller may be further programmed to, in response to activating the electric pump, increase torque of the engine to prevent a speed of the engine from decreasing. The controller may be further programmed to operate the engine at a speed that is at least a predetermined engine speed that is configured to cause the mechanical pump to rotate at a predetermined pump speed at which a fluid pressure exceeds a predetermined locking pressure of the clutch. The controller may be programmed to command transmission shift clutches that are coupled to a same fluid circuit as the clutch to an off state to maximize pressure to the clutch. The mechanical pump may be operable to cause a fluid pressure that is greater than a predetermined locking pressure that causes the clutch to lock. The electric pump may be operable to cause the fluid pressure to not exceed a predetermined electric pump maximum pressure that is less than the predetermined locking pressure.

A method includes activating an electric pump to pressurize a clutch disposed between an engine and an electric machine in response to the electric machine being unable to drive a mechanical pump configured to pressurize the clutch, and starting and operating the engine to drive the mechanical pump to achieve a lock pressure of the clutch.

The method may further include operating transmission shift clutches that are coupled to a same fluid circuit as the clutch in an off state to maximize pressure to the clutch. The method may further include operating the engine at a speed that is at least a predetermined engine speed configured to cause the mechanical pump to rotate at a predetermined pump speed at which a fluid pressure meets or exceeds the lock pressure of the clutch. The method may further include increasing a torque of the engine in response to activating the electric pump to prevent a speed of the engine from decreasing. The method may further include disabling auto-stopping of the engine in response to the electric machine being inoperable. The method may further include operating the engine to satisfy a torque demand for propulsion responsive to the clutch being fully pressurized.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
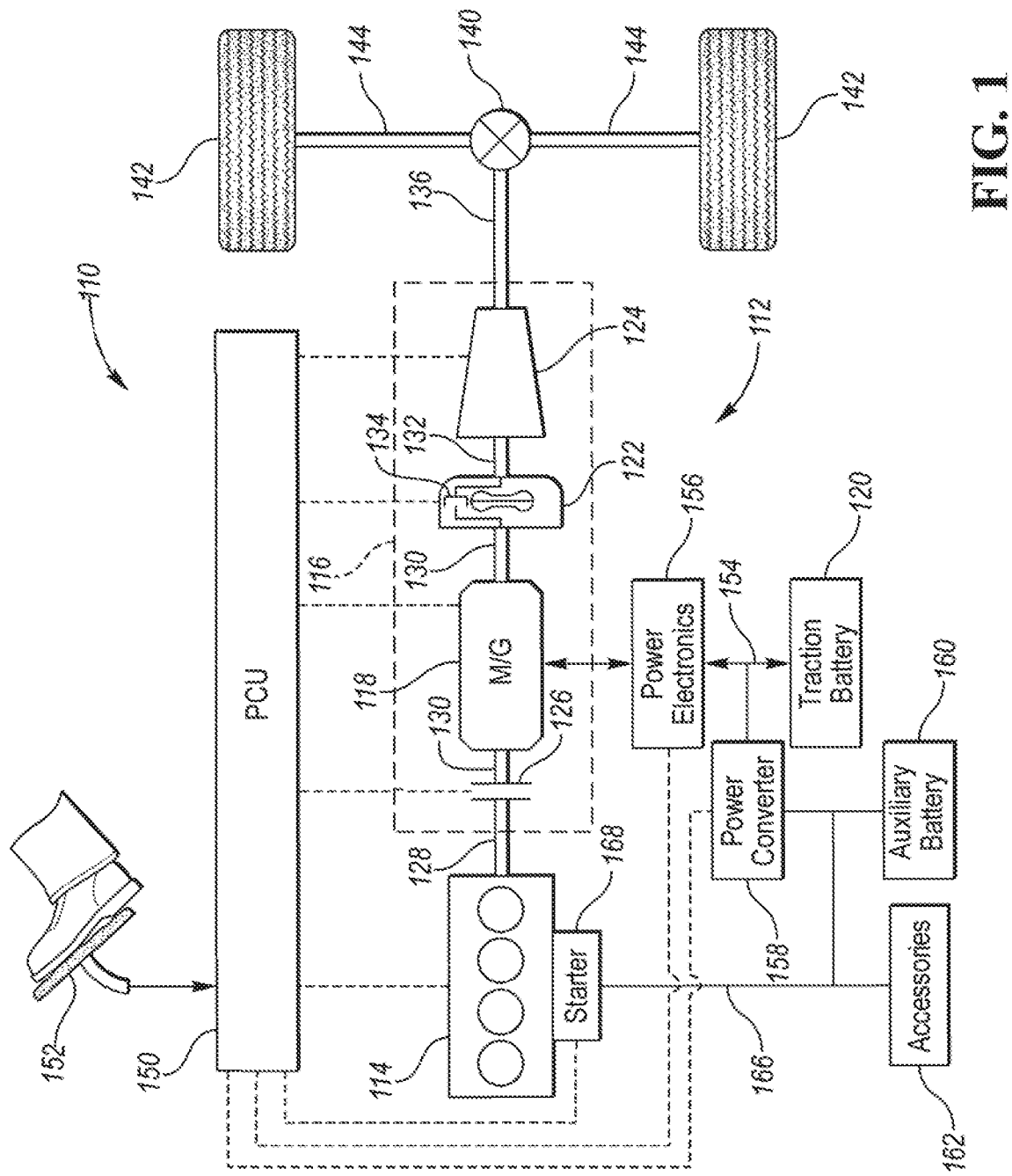
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. The M/G shaft 130 extends through the M/G 118. The M/G 118 is continuously drivably connected to the M/G shaft 130, whereas the engine 114 is drivably connected to the M/G shaft 130 only when the disconnect clutch 126 is at least partially engaged.

The M/G 118 is connected to the torque converter 122 via M/G shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements may be controlled according to a shift schedule that sequences connecting and disconnecting certain elements of the gear sets to control the ratio between a transmission output shaft 136 and the transmission input shaft 132. The gearbox 124 is automatically shifted from one ratio to another based on various vehicle and ambient operating conditions by an associated controller 150, such as a powertrain control unit (PCU). The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 may further include an associated powertrain control unit (PCU) 150. While illustrated as one controller, the PCU may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge the traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller (PCU) 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by the controller (PCU) 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by the controller (PCU) 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 is operated to isolate the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to a power electronics module 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The controller 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from wheels 142, while rotating, is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure. Other hybrid vehicle configurations are possible (e.g., power-split configuration) and the inventive aspects disclosed herein are applicable to these other configurations.

The vehicle 110 may utilize the M/G 118 to start the engine 114. The controller 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, an auxiliary starter 168 may also be coupled to the engine 114 to provide a secondary or backup means of starting the engine 114. The auxiliary starter 168 may be a belt-integrated starter generator (BISG) system in which an electric machine is coupled to the engine 114 via a belt driven assembly. The auxiliary starter 168 may be an electric machine with a ring gear that interacts with a flywheel that is coupled to the engine 114. The electric machine associated with the auxiliary starter 168 may be operable using low-voltage power (e.g., provided by a 12V power system) or high-voltage power (e.g., provided by the traction battery 120).

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The vehicle 110 may include a display. For example, the display may be a part if an instrument panel. The display may include lamps, lights and/or other indicators for alerting the operator of conditions related to the vehicle. The display may be a liquid crystal display (LCD) module. The display may be in communication with controllers (e.g., PCU 150) that are coupled to a communication bus.

Figure 2:
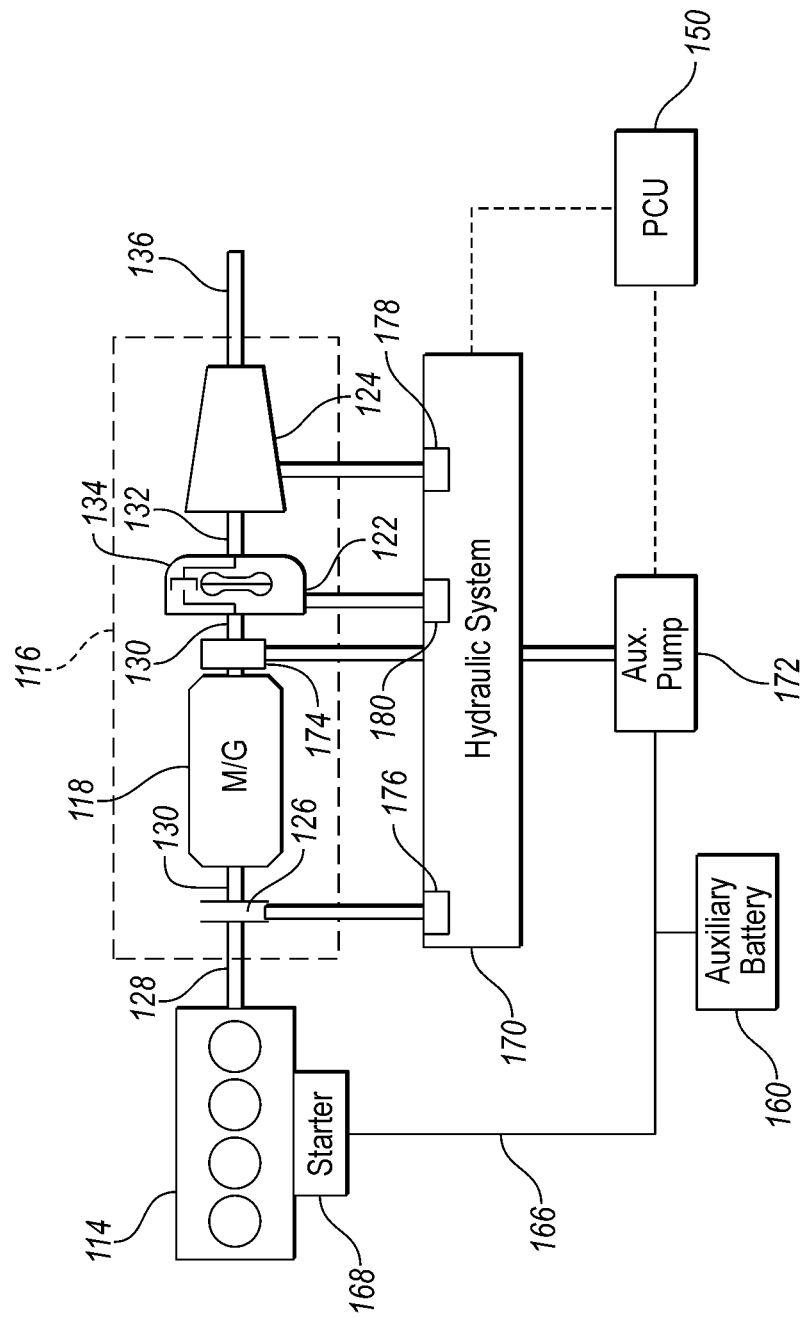
FIG. 2 is a block diagram of the hybrid powertrain including a hydraulic control system.

FIG. 2 depicts further aspects of the hybrid powertrain. The hybrid powertrain and/or transmission 116 may include a hydraulic system 170. The hydraulic system 170 may be configured to route and deliver fluid to various components within the transmission 116. The hydraulic system 170 may include a reservoir for hydraulic fluid. The hydraulic system 170 may provide fluid to the disconnect clutch 126, the torque converter 122, and the gearbox 124. The hydraulic system 170 may include valves and hydraulic actuators to control the flow of fluid within the hybrid powertrain. The hydraulic actuators may be configured for engaging/disengaging clutches and shifting gears. Solenoids may be coupled to the valves and actuators to provide an interface to the controller 150 for controlling the valves and actuators.

The hydraulic system 170 may include one or more disconnect clutch control valves 176 that may be configured to enable and disable fluid flow to the disconnect clutch 126. The disconnect clutch control valves 176 may include solenoids that interface with the controller 150. In some configurations, a single disconnect clutch control valve 176 may be implemented. When activated, the disconnect clutch control valve 176 may flow fluid to the disconnect clutch 126 to engage the disconnect clutch 126. When deactivated, fluid may be released from the disconnect clutch 126 to disengage the disconnect clutch 126. In some configurations, the disconnect clutch control valve 176 may be comprised of multiple valves that are configured to build, hold, and release fluid pressure of the disconnect clutch 126 depending on activation of the valves.

The hydraulic system 170 may include one or more gearbox control valves 178 with associated solenoids that interface to the controller 150. When actuated, the gearbox control valves 178 may allow fluid to flow to the associated actuator and, when deactivated, may allow fluid to be released from the associated actuator. The gearbox control valves 178 may be configured to control the selected gear of the gearbox 124. By activating various combinations of the gearbox control valves 178, different gear ratios may be selected. In addition, neutral and park gears may be selected by activating selected combinations of the gearbox control valves 178.

The hydraulic system may include one or more torque converter control valves 180 with associated solenoids that interface to the controller 150. The torque converter control valves 180 may be configured to engage and disengage the bypass clutch 134. When actuated, the torque converter control valves 180 may allow fluid to flow to the associated actuator and, when deactivated, may allow fluid to be released from the associated actuator.

Operation of the hydraulic system 170 may depend upon a pressure of the fluid in the hydraulic system 170. Each of the components operated by the valves and hydraulic actuators may be characterized by a pressure at which proper operation is expected. For example, the disconnect clutch 126 may be characterized by a predetermined full pressure level for full engagement of the disconnect clutch 126. When the fluid pressure meets or exceeds the predetermined full pressure level, the disconnect clutch 126 may be fully engaged or locked. The disconnect clutch 126 may be fully engaged when the fluid pressure exceeds the predetermined full pressure level. That is, the crankshaft 128 and M/G shaft 130 may be coupled and rotate together with no slip across the disconnect clutch 126. In this mode, engine torque may be fully transferred to the M/G shaft 130. At a fluid pressure that is less than the predetermined full pressure level, the disconnect clutch 126 may not be fully engaged. Under this condition, the crankshaft 128 and the M/G shaft 130 may not rotate at the same speed and there may be slip across the disconnect clutch 126. The amount of slip may be dependent upon the pressure level of the fluid. In this mode, engine torque may only be partially transferred to the M/G shaft 130.

The transmission 116 may further include a mechanically driven transmission pump 174. The transmission pump 174 may be configured to pressurize the fluid within the hydraulic system 170. The transmission pump 174 may be coupled to the M/G shaft 130. Rotation of the M/G shaft 130 may cause the transmission pump 174 to pressurize the fluid. When rotated at or above a predetermined speed, the transmission pump 174 may pressurize the hydraulic fluid to at least the predetermined full pressure level (e.g., fully pressurized). When rotating at a speed less than the predetermined speed, the transmission pump 174 may pressurize the hydraulic fluid to a pressure that is less than the predetermined full pressure level (e.g., partially pressurized). The hydraulic fluid pressure may be a function of the rotational speed of the transmission pump 174. During intervals of no rotation of the M/G shaft 130, the transmission pump 174 cannot increase pressure in the hydraulic system 170. The M/G 118 may be powered from the traction battery 120 and be controlled to cause rotation of the M/G shaft 130 and the transmission pump 174.

Movement of the fluid through the hydraulic system 170 depends upon the fluid being pressurized. During normal operation, the transmission pump 174 builds fluid pressure when the M/G shaft 130 is rotating. Further, the speed of the transmission pump 174 may be maintained above a predetermined speed by operating the M/G 118. There may be conditions during which the M/G 118 cannot provide torque to rotate the transmission pump 174. For example, a loss of traction battery power (e.g., caused by diagnostic condition, depletion, low battery discharge limit) may render the M/G 118 unable to be driven to provide torque for rotating the M/G shaft 130. Diagnostic conditions related to the power electronics 156 may lead to an inability of the M/G 118 to operate. If the transmission pump 174 stops rotating, fluid pressurization may be lost. The loss of fluid pressurization can lead to an inability to engage the disconnect clutch 126 or shift gears of the gearbox 124. Vehicle propulsion is not available without the ability to operate the M/G 118 or engage the disconnect clutch 126. An alternate means of pressurizing the fluid may be beneficial if the M/G 118 is unable to rotate the transmission pump 174.

The hybrid powertrain may include an electrically driven auxiliary pump 172. The auxiliary pump 172 may be configured to pressurize the fluid in the hydraulic system 170. The auxiliary pump 172 may receive power from the low-voltage bus 166 and/or the auxiliary battery 160. The auxiliary pump 172 may include an electric motor that is configured to drive a pumping mechanism. The auxiliary pump 172 may be operated by a controller, such as the PCU 150. The controller 150 may include driver circuitry configured to activate and deactivate the auxiliary pump 172. Since the auxiliary pump 172 is powered from the low-voltage bus 166, it may be able to operate during conditions in which the transmission pump 174 is inoperable due to issues related to the high-voltage components. The capacity of the auxiliary pump 172 to pressurize the fluid may be less than that of the transmission pump 174. The auxiliary pump 172 may have the capacity to build pressure up to a first predetermined pressure limit. The transmission pump 174 may have the capacity to build pressure up to a second predetermined pressure limit that is greater than the first predetermined pressure limit. In some configurations, the auxiliary pump 172 may be incapable of pressurizing the hydraulic system 170 up to the predetermined full pressure level for locking the disconnect clutch 126. That is, the auxiliary pump 172 may only be capable of partially pressurize the fluid in the hydraulic system 170.

When the M/G 118 is operable, the M/G 118 may be controlled to rotate the transmission pump 174. The M/G 118 may be controlled to a speed that is at least a predetermined speed to ensure that full pressurization of the hydraulic system 170 is available. Under these conditions, the disconnect clutch 126 may be fully engaged by directing pressurized fluid to the disconnect clutch 126 (e.g., activating the disconnect clutch control valve 176). When the M/G 118 is not operable, the M/G 118 cannot drive the transmission pump 174 to pressurize the fluid. Further, if the M/G 118 is not operable, propulsion by the M/G 118 is prevented. The engine 114 is the remaining source of propulsive torque for the vehicle. However, the engine 114 may not provide propulsive torque to move the vehicle when the disconnect clutch 126 is disengaged.

If the M/G 118 becomes inoperable, it may be desired to start the engine 114 if the engine 114 is presently stopped. It is apparent that under these conditions, the M/G 118 is unavailable to crank the engine 118 for starting. In this situation, the auxiliary starter 168 may be activated to crank the engine 118. The controller 150 may command activation of the auxiliary starter 168. The auxiliary starter 168 may crank the engine 118 such that the engine 118 may be started. The controller 150 may then control fuel and spark during the starting process to achieve starting of the engine 114. The engine 118 may be operated at an idle speed after starting.

If the M/G 118 becomes inoperable to drive the transmission pump 174, another way of engaging the disconnect clutch 126 must be developed or the vehicle cannot be propelled. The auxiliary pump 172 may be used to pressurize the fluid to a level sufficient to partially transfer engine torque to the M/G shaft 130. The controller 150 may be programmed to energize or activate the auxiliary pump 172. The auxiliary pump 172, may build fluid pressure in the hydraulic system 170 up to a predetermined pressure. The predetermined pressure may be sufficient to partially engage the disconnect clutch 126.

There may be other hydraulic actuators that depend upon the pressurized fluid to function. When the auxiliary pump 172 is activated, it may be desired to deactivate other hydraulic actuators within the hydraulic system 170. Any additional hydraulic actuators that are active may act to reduce the fluid pressure available to the disconnect clutch 126. The controller 150 may command deactivation of other hydraulic actuators and valves when the auxiliary pump 172 is activated. For example, the gearbox control valves 178 may be deactivated (e.g., operated in an off state) while the auxiliary pump 172 is activated.

When the engine 114 is running and the fluid is pressurized by the auxiliary pump 172, the disconnect clutch 126 may be partially engaged. The controller 150 may activate the disconnect clutch control valve 176 to allow fluid to flow to the disconnect clutch 126 to partially engage the disconnect clutch 126. As the fluid pressure created by the auxiliary pump 172 may be less than the predetermined full pressure level, the disconnect clutch 126 may be only partially engaged such that only a portion of the engine torque is passed through the disconnect clutch 126.

Prior to or upon partially engaging the disconnect clutch 126, the controller 150 may operate the engine 118 to increase the engine torque. The increase in engine torque before partially engaging the disconnect clutch 126 may avoid stalling or sagging of the engine 118 when the additional load is added. The controller 150 may also control the engine speed to a value greater than a normal idle speed to prevent the engine speed from becoming too low when the disconnect clutch 126 is partially engaged.

Prior to partially engaging the disconnect clutch 126, the controller 150 may operate the gearbox control valves 178 to select a non-driving gear to reduce the load. For example, the gearbox control valves 178 may be commanded to select a neutral or park gear so the torque is not transferred to the drive wheels. Operating the gearbox 124 in a non-driving gear prevents the engine speed from sagging and allows the mechanical pump 174 to increase speed in less time.

When the disconnect clutch 126 is partially engaged, the M/G shaft 130 will begin to rotate causing rotation of the transmission pump 174. As the speed of the transmission pump 174 increases, the fluid pressure in the hydraulic system 170 will increase. As fluid pressure builds in the hydraulic system 170, the torque carried through the disconnect clutch 126 increases which may further increase the speed of the transmission pump 174. When the transmission pump 174 achieves a predetermined full pressure speed, the hydraulic system 170 may be pressurized to the predetermined full pressure level. When the fluid is pressurized to at or above the predetermined full pressure level, the disconnect clutch 126 may become fully engaged or locked.

While the disconnect clutch 126 is engaged, vehicle propulsion is possible using the engine 114. Full engine power for propulsion may be achieved when the disconnect clutch 126 is fully engaged. The hybrid powertrain may operate as a conventional, engine-driven vehicle. In this mode, so long as the M/G 118 is inoperable, the engine 114 may optionally be maintained in a running state. For example, auto-stopping and auto-starting may be disabled. Note that if the engine auto-stop/start function remains enabled, response times may be increased when compared to full operation with the M/G 118 being operable. For example, the engine 114 may require a longer time for starting and more time may be required before vehicle propulsion is available.

Figure 3:
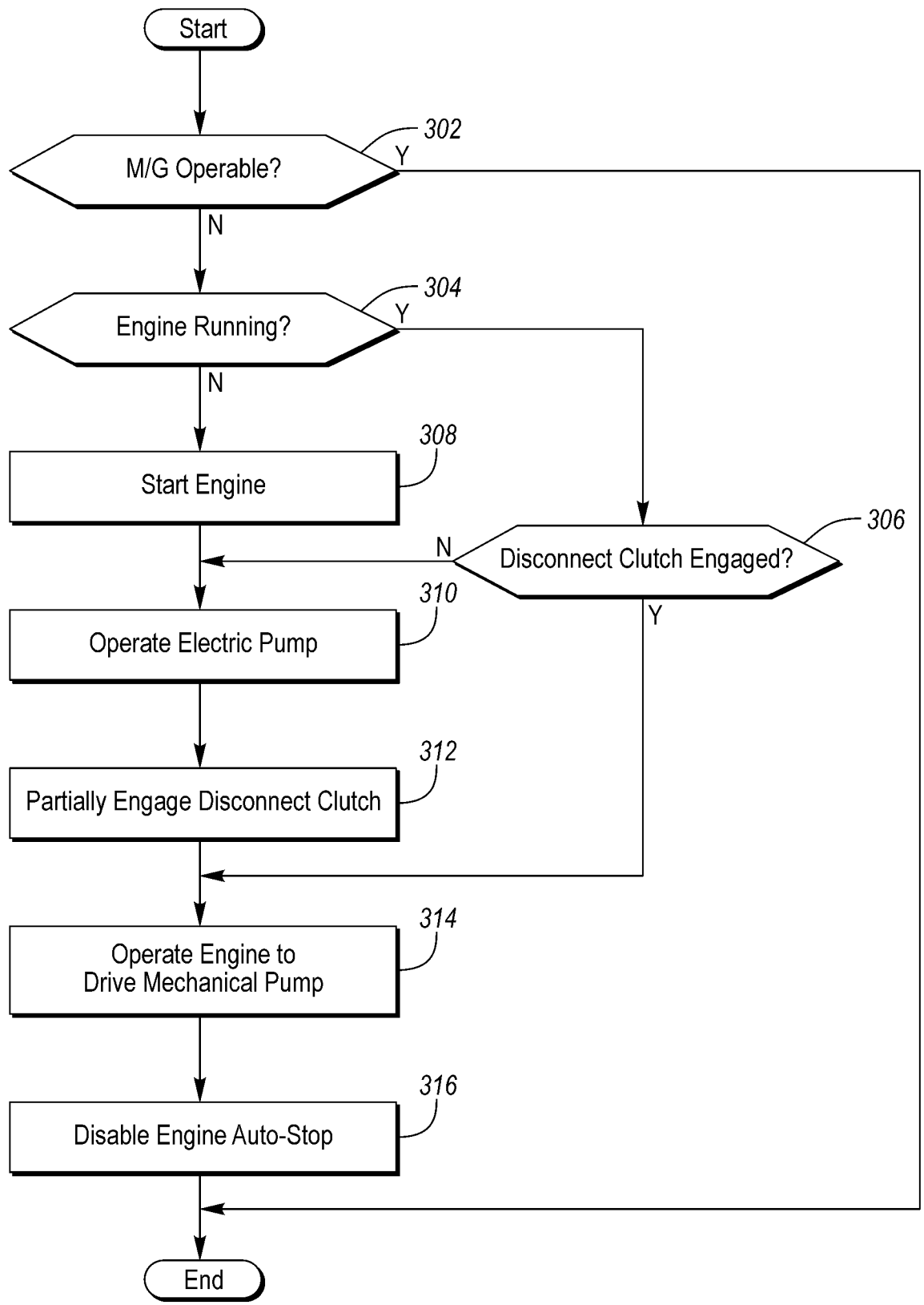
FIG. 3 is a flowchart for a possible sequence of operations for controlling the hybrid powertrain.

FIG. 3 depicts a flowchart depicting a possible sequence of operations for a hybrid powertrain control system that may be executed by the controller 150. The sequence of operations may be performed when the vehicle is in a run or ignition on mode during which vehicle propulsion is expected to be available. At operation 302, a check may be made to determine if the M/G 118 is operable. The controller 150 may monitor parameters associated with the traction battery 120. For example, a discharge limit of the traction battery 120 falling below a minimum discharge limit may cause the M/G 118 to be inoperable. A temperature associated with the traction battery 120 exceeding a maximum temperature may cause the M/G 118 to be inoperable. In addition, diagnostic conditions associated with the traction battery 120 may cause the M/G 118 to be inoperable. Any condition that causes the traction battery 120 to be unable to deliver power may cause the M/G 118 to be inoperable.

The controller 150 may monitor parameters associated with the power electronics 156. For example, a temperature associated with the power electronics that exceeds a predetermined maximum temperature may cause the M/G 118 to be inoperable. Diagnostic conditions indicating that the power electronics 156 is inoperable may also cause the M/G 118 to be inoperable. Any condition that causes the power electronics 156 to be unable to operate and control the M/G 118 may cause the M/G 118 to be deemed inoperable.

The controller 150 may monitor parameters associated with the M/G 118. For example, a temperature associated with the M/G 118 that exceeds a predetermined maximum temperature may cause the M/G 118 to be inoperable. Diagnostic conditions associated with the M/G 118 may also cause the M/G 118 to be inoperable. For example, a malfunction with a resolver configured to measure an angular position of the M/G shaft 130 may prevent accurate control and may cause the M/G 118 to be inoperable.

If the M/G 118 is operable, execution of the operations may be bypassed and normal operation may be pursued. If the M/G 118 is inoperable, then operation 304 may be performed. At operation 304, a check may be performed to determine if the engine 114 is running. For example, a status indication from an engine controller may be monitored for the running state of the engine 114.

If the engine 114 is not running, operation 308 may be performed. At operation 308, the engine 114 may be started. The controller 150 may start the engine 114 by activating the auxiliary starter 168. The controller 150 may further control spark and fuel applied to the engine 114 to facilitate starting. The controller 150 may further command the gearbox 124 to a non-driving gear such as Neutral or Park. After the engine 114 has started, operation 310 may be performed. At operation 310, the controller 150 may activate the electric pump 172 to partially pressurize the hydraulic system 170. At operation 312, the disconnect clutch 126 may be partially engaged. A delay time may be present between operation 310 and operation 312 to permit the pressure to build to a predetermined pressure level. To partially engage the disconnect clutch 126, the controller 150 may activate the disconnect clutch control valve 176 that permits the pressurized fluid to flow to the disconnect clutch 126. In addition to activating the disconnect clutch control valve 176, the controller 150 may deactivate valves associated with other fluid consumers within the hydraulic system 170 (e.g., operate gearbox control valves 178 in an off state). Since the fluid is not fully pressurized to the desired operating pressure when pressurized by the electric pump 172, the disconnect clutch 126 becomes partially engaged. At operation 314, the engine 114 may be operated to drive the mechanical transmission pump 174. The controller 150 may control the engine torque and engine speed to cause the transmission pump 174 to rotate at a speed that is at least equal to a predetermined speed. The predetermined speed may be selected such that the fluid pressure is greater than the predetermined full pressure level. At operation 316, engine auto-stops may be disabled to prevent the engine 114 from turning off while the M/G 118 is inoperable.

At operation 304, if the engine 114 is running, then operation 306 may be performed. At operation 306 a check may be performed to determine if the disconnect clutch 126 is presently engaged. Engagement of the disconnect clutch 126 may be checked based on the activation status of the disconnect clutch control valve 176 and/or the pressure of the fluid in the hydraulic system 170. The hydraulic system 170 may include one or more pressure sensors that are interfaced with the controller 150 and configured to monitor the fluid pressure at one or more points within the hydraulic system 170. If the disconnect clutch 126 is not engaged, operation may proceed to operation 310 to activate the electric pump 172 followed by operation 312 to partially engage the disconnect clutch 126. If the disconnect clutch 126 is engaged, operation 314 may be performed to operate the engine 114 to maintain the disconnect clutch 126 in the engaged state.

The systems and methods described allow vehicle operation in the event of the M/G being inoperable. By implementing an alternative way of starting the vehicle and pressurizing the hydraulic system, vehicle propulsion may be maintained when the M/G is inoperable. In addition, the method only requires low-voltage power to bring the hybrid powertrain to a state of propulsion availability. This is useful in the event of a loss of or unavailability of the high-voltage power system. By implementing the disclosed system and methods, hybrid propulsion system availability is improved.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid powertrain control system comprising:
   a controller programmed to, responsive to an electric machine, configured to drive a mechanical pump operable to pressurize fluid for a clutch between an engine and the electric machine, being inoperable,
      activate an auxiliary starter to start the engine,
      activate an electric pump configured to pressurize the fluid,
      actuate a valve to flow fluid to the clutch, and
      operate the engine to drive the mechanical pump.

2. The hybrid powertrain control system of claim 1 wherein the mechanical pump is operable to pressurize fluid for the clutch to a fluid pressure that is greater than a predetermined locking pressure that causes the clutch, when the valve is actuated, to lock.

3. The hybrid powertrain control system of claim 2 wherein the electric pump is operable to pressurize the fluid for the clutch to at a fluid pressure level that is less than or equal to a predetermined electric pump maximum pressure that is less than the predetermined locking pressure.

4. The hybrid powertrain control system of claim 1 wherein the controller is programmed to command transmission shift clutches that are coupled to a same fluid circuit as the clutch to an off state to maximize pressure to the clutch.

5. The hybrid powertrain control system of claim 1 wherein the controller is further programmed to operate the engine at a speed that is at least a predetermined engine speed that is configured to cause the mechanical pump to rotate at a predetermined pump speed at which a fluid pressure exceeds a predetermined locking pressure of the clutch.

6. The hybrid powertrain control system of claim 1 wherein the controller is further programmed to, in response to activating the electric pump, increase torque of the engine to prevent a speed of the engine from decreasing.

7. The hybrid powertrain control system of claim 1 wherein the controller is further programmed to, responsive to the electric machine being inoperable, disable auto-stopping of the engine.

8. A vehicle comprising:
   a clutch selectively coupling an engine and an electric machine;
   a mechanical pump driven by the electric machine and operable to pressurize fluid for the clutch; and
   a controller programmed to, responsive to the electric machine being inoperable,
      activate an electric pump operable to pressurize fluid to the clutch, and
      activate an auxiliary starter to start the engine to drive the mechanical pump.

9. The vehicle of claim 8 wherein the controller is further programmed to, in response to the electric machine being inoperable, disable auto-stopping of the engine.

10. The vehicle of claim 8 wherein the controller is further programmed to, in response to activating the electric pump, increase torque of the engine to prevent a speed of the engine from decreasing.

11. The vehicle of claim 8 wherein the controller is further programmed to operate the engine at a speed that is at least a predetermined engine speed configured to cause the mechanical pump to rotate at a predetermined pump speed at which a fluid pressure exceeds a predetermined locking pressure of the clutch.

12. The vehicle of claim 8 wherein the controller is programmed to command transmission shift clutches that are coupled to a same fluid circuit as the clutch to an off state to maximize pressure to the clutch.

13. The vehicle of claim 8 wherein the mechanical pump is operable to cause a fluid pressure that is greater than a predetermined locking pressure that causes the clutch to lock.

14. The vehicle of claim 13 wherein the electric pump is operable to cause the fluid pressure to not exceed a predetermined electric pump maximum pressure that is less than the predetermined locking pressure.

15. A method comprising:
   activating an electric pump to pressurize a clutch disposed between an engine and an electric machine in response to the electric machine being unable to drive a mechanical pump configured to pressurize the clutch; and
   starting and operating the engine to drive the mechanical pump to achieve a lock pressure of the clutch.

16. The method of claim 15 further comprising operating transmission shift clutches that are coupled to a same fluid circuit as the clutch in an off state to maximize pressure to the clutch.

17. The method of claim 15 further comprising operating the engine at a speed that is at least a predetermined engine speed configured to cause the mechanical pump to rotate at a predetermined pump speed at which a fluid pressure meets or exceeds the lock pressure of the clutch.

18. The method of claim 15 further comprising increasing a torque of the engine in response to activating the electric pump to prevent a speed of the engine from decreasing.

19. The method of claim 15 further comprising disabling auto-stopping of the engine in response to the electric machine being inoperable.

20. The method of claim 15 further comprising operating the engine to satisfy a torque demand for propulsion responsive to the clutch being pressurized.

* * * * *